(No Model.)

M. MARTIN.
MACHINE WRENCH.

No. 456,830. Patented July 28, 1891.

WITNESSES:
Donn Twitchell
C. Sedgwick

INVENTOR:
M. Martin
BY Munn & Co.
ATTORNEYS

UNITED STATES PATENT OFFICE.

MARSHALL MARTIN, OF WALLA WALLA, WASHINGTON.

MACHINE-WRENCH.

SPECIFICATION forming part of Letters Patent No. 456,830, dated July 28, 1891.

Application filed December 31, 1890. Serial No. 376,337. (No model.)

*To all whom it may concern:*

Be it known that I, MARSHALL MARTIN, of Walla Walla, in the county of Walla Walla and State of Washington, have invented a new and useful Improvement in Machine-Wrenches, of which the following is a full, clear, and exact description.

This invention consists in a machine-wrench and bolt-holder of novel construction especially adapted to be applied to the rims of carriage and other vehicle wheels for holding and fastening the screw bolts and nuts which assist in securing the tires on said wheels and for unscrewing said bolts when required to remove the tire, substantially as hereinafter described, and more particularly pointed out in the claims.

Reference is to be had to the accompanying drawings, forming a part of this specification, in which similar letters of reference indicate corresponding parts in all the figures.

Figure 1:
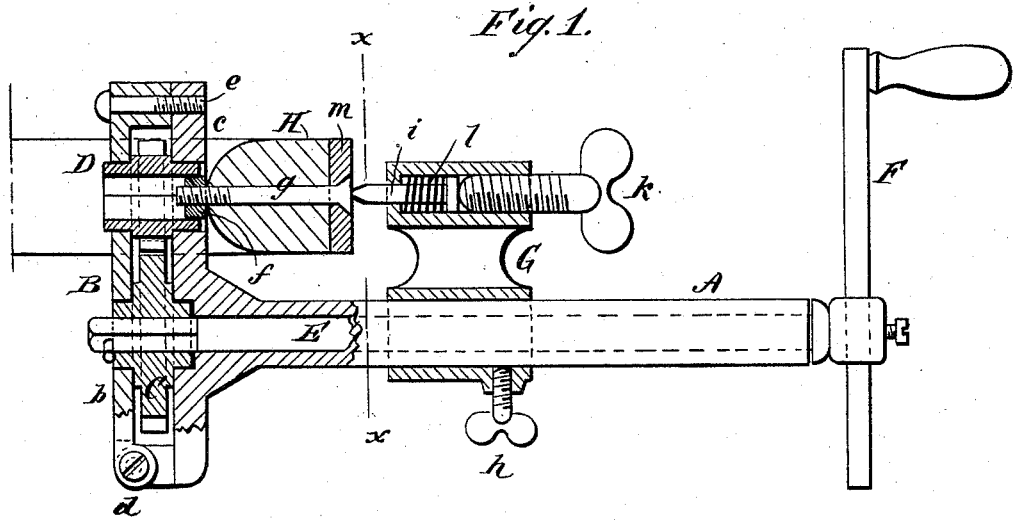
Figure 2:
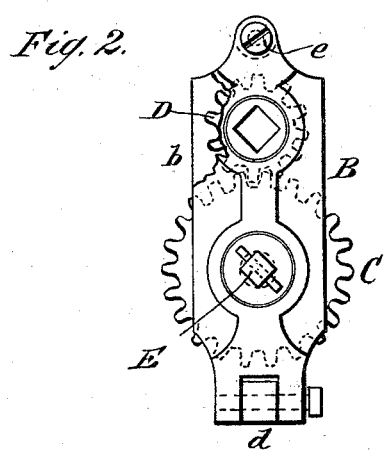
Figure 3:
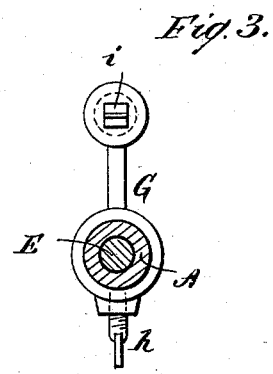

Figure 1 represents a partly-sectional longitudinal elevation or view of a wheel-rim, wrench, and bolt-holder embodying my invention, and showing the rim of a wheel in part, having one of the bolts and nuts which secure its tire applied. Fig. 2 is an end view of the machine or implement from its gear side, and Fig. 3 is a transverse section upon the line $x$ $x$ in Fig. 1.

A indicates what may be termed the "bed" of the machine or implement, consisting of a pipe having on its one end a housing B, which is composed of two transverse plates $b$ and $c$, arranged at a suitable distance apart and hinged together at their one end, as at $d$, and secured by a screw $e$ or other fastening at their other end to admit of opening and closing the housing, as required. This housing B contains toothed gears C and D, the one C of which is in axial line with the pipe A, and is driven or operated by a shaft E, running through said pipe and operated by a crank F on the opposite end of the machine. The other wheel or pinion D, which gears with the wheel C and is rotated by the latter, constitutes what I term a "cog-die," adapted to receive and hold, so as to rotate with it, the nut $f$ of the screw-bolt $g$ to be tightened up or removed, and which cog-die may be substituted for another to hold a nut of different size on opening the hinged housing B for the purpose.

Upon the pipe A is arranged a bolt-holding device or puppet G, adjustable along said pipe or bed and secured when adjusted by a set-screw $h$. This device G carries within it, in line with the axial center of the nut-holding cog-die D, an angular-headed longitudinally-sliding bolt $i$, adjustable toward the housing B by means of a thumb-screw $k$, and when relieved from the action of said thumb-screw forced back by a spring $l$. The sliding bolt $i$ is chisel-shaped at its forward end to engage by pressure with the countersinking head of the screw-bolt $g$, and, as said bolt $i$ is prevented from turning, to hold the bolt $g$ from turning.

To apply the machine the rim H of the carriage-wheel is suitably supported and arranged so as to be intermittently turned around the housing B in central relation with the bolt $i$ and cog-die D and the point of the bolt $i$, engaged by pressure with the head of the screw-bolt $g$, which assists in securing the tire $m$ on the rim of the wheel to its place. The shaft E is then rotated to set in motion, through the wheel C, the cog-die D, which carries and rotates the nut $f$ and so tightens up the screw-bolt $g$ and tire on the rim H of the wheel, as required. When it is required to unscrew said screw-bolts, the motion of the machine is simply reversed. Each succeeding tire-holding bolt $g$ in the rim H of the wheel is similarly and successively secured or released, and by thus tightening up or releasing said bolts or their nuts $f$ much labor is saved as compared with the ordinary mode of applying and securing and removing or unscrewing said bolts or nuts. The adjustment of the puppet G along the bed or pipe A adapts the implement to different thicknesses of wheel-rims, and the automatic retiring action of the bolt $i$ on turning back the thumb-screw $k$ facilitates release of said bolt from each screw-bolt $g$ after its nut $f$ has been tightened or removed; also, the spring $l$ serves to hold the bolt $i$ in engagement with the screw-bolt $g$ while its nut $f$ is being tightened or released. Furthermore, the hinged opening and closing housing B facilitates the changing of one cog-die D for another adapted to carry a nut $f$ of different size.

Having thus described my invention, what I claim as new, and desire to secure by Letters Patent, is—

1. In a combined machine-wrench and bolt-holder for the purpose herein described, the combination, with the cog-die and its toothed driving gear and shaft for operating the same, of a housing containing said cog-die and gear, composed of separate plates hinged together and united by a fastening adapted to admit of the housing being opened, as required, substantially as specified.

2. In a machine-wrench and bolt-holder, the combination, with a rotatable nut-holding cog-die, of an adjustable puppet provided with a longitudinally-sliding chisel-nosed bolt, and a spring and thumb-screw controlling said bolt, essentially as and for the purposes herein set forth.

3. The combination of the tubular bed or pipe A with its attached hinged or opening and closing housing B, the shaft E, the gear C, the cog-die D, and the adjustable puppet G, with its adjustable holding-bolt $i$, substantially as shown and described, and for the purpose specified.

MARSHALL MARTIN.

Witnesses:
W. G. VAN VALKENBURGH,
RICHARD A. BOYLE.